United States Patent
Maniar et al.

(10) Patent No.: US 7,509,285 B1
(45) Date of Patent: Mar. 24, 2009

(54) METHOD OF ESTABLISHING A CREDIT LIMIT

(75) Inventors: Mayur Harshadray Maniar, Herndon, VA (US); Vivek Puri, McLean, VA (US); Katherine Ella David, Arlington, VA (US); Shawn Michael Budde, Alexandria, VA (US)

(73) Assignee: Capital One Financial Corporation, Falls Church, VA (US)

( * ) Notice: Subject to any disclaimer, the term of this patent is extended or adjusted under 35 U.S.C. 154(b) by 1576 days.

(21) Appl. No.: 09/651,320

(22) Filed: Aug. 31, 2000

(51) Int. Cl.
*G06Q 40/00* (2006.01)

(52) U.S. Cl. ............................. 705/38; 705/35; 705/67

(58) Field of Classification Search ................ 705/38, 705/44
See application file for complete search history.

(56) References Cited

U.S. PATENT DOCUMENTS

| | | | |
|---|---|---|---|
| 5,777,306 A | | 7/1998 | Masuda |
| 5,950,179 A | * | 9/1999 | Buchanan et al. ............. 705/38 |
| 5,970,478 A | * | 10/1999 | Walker et al. .................. 705/35 |
| 6,032,136 A | * | 2/2000 | Brake et al. .................... 705/41 |
| 6,088,686 A | * | 7/2000 | Walker et al. ................. 705/38 |
| 6,144,948 A | * | 11/2000 | Walker et al. ................. 705/38 |
| 6,158,657 A | * | 12/2000 | Hall et al. .................... 235/380 |
| 6,282,658 B2 | | 8/2001 | French et al. |
| 6,488,206 B1 | * | 12/2002 | Flaig et al. .................. 235/380 |
| 6,604,090 B1 | * | 8/2003 | Tackett et al. ................. 706/11 |
| 6,636,833 B1 | * | 10/2003 | Flitcroft et al. ................. 705/1 |
| 2002/0077964 A1 | * | 6/2002 | Brody et al. .................. 705/38 |

* cited by examiner

*Primary Examiner*—Andrew J. Fischer
*Assistant Examiner*—C. Aaron McIntyre
(74) *Attorney, Agent, or Firm*—Finnegan, Henderson, Farabow, Garrett & Dunner, L.L.P.

(57) ABSTRACT

A system and method is provided for offering and providing credit card products. The disclosed systems and method provide a credit card product whose credit limit is determined at the time of activation. The applicant receives a credit card that has not been activated. When the applicant contacts the issuer to activate the credit card and learn the credit limit, the actual credit limit for the credit card is determined based on the individual's credit history and answers to risk-splitting questions. After determining the credit limit, a customer account is established and the customer is notified of the credit limit.

39 Claims, 5 Drawing Sheets

METHOD OF ESTABLISHING A CREDIT LIMIT

BACKGROUND OF THE INVENTION

I. Field of the Invention

The present invention is related to credit card products and to methods for providing such products. More particularly, the invention relates to methods that establish and assign a credit limit according to credit and risk-splitting information.

II. Background and Material Information

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions). With a credit card, an authorized customer or cardholder is capable of purchasing services and/or merchandise without an immediate, direct exchange of cash. With each purchase, the cardholder incurs debt which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred.

The spending power of a credit card (i.e., the total amount of funds available to the cardholder at any particular time for making purchases) is typically limited to a particular amount predetermined by the issuer of the card. This amount is commonly referred to as the "credit limit" of the credit card. The size of the issuer-imposed credit limit is generally based on "credit information," including a number of non-exclusive factors, the most important of which are often the applicant's earning capacity and the applicant's credit history. Credit information is normally collected from one or more credit bureaus. In order to augment credit bureau information and offer the applicant a higher or lower credit limit, credit card issuers generally pose a variety of additional questions that give more detail about the applicant's financial status. These "risk-splitting questions" provide additional information about the applicant that typically is not reported by a credit bureau or provided by general credit information. Such information may include whether the applicant owns a home, a car or other property and whether the applicant purchases insurance on these properties. Information provided by answers to such risk-splitting questions enables the issuer to offer to the applicant a higher credit limit, while reducing the added risk of such an offer above the credit limit based entirely upon credit information.

Typically, credit card issuers include and pose risk-splitting questions on an application for the credit card. The problem with this technique is that including such questions on the application encumbers the application process, which has been proven to reduce the number of applicants. Direct mail campaigns have found that eliminating risk-splitting questions from application forms increased the response rate by more than 50%. However, eliminating the questions decreased the issuer's confidence in the initial risk assessment on applicant accounts. The result of eliminating the risk-splitting questions is that low risk applicants get lower credit limits and higher risk applicants get higher credit limits than would be ideal for the applicant and the credit card issuer. Therefore, the risk-splitting questions are necessary to allow optimal credit limit assignment to each applicant and increase the value of the credit card product to the applicant and the issuer.

In addition, another problem with static risk-splitting questions on the application form is that the responses to the risk-splitting questions may change from the time the application form is completed by the applicant and the time when the credit card is issued and activated. Similarly, the issuer may want to ask different permutations of questions to the applicant based on the applicant's answers to certain risk-splitting questions. The static risk-splitting questions on the application form cannot be tailored to the answers of each applicant.

In view of the foregoing, there is presently a need for an improved system and method for providing credit card products. For example, a need exists for a credit card product that minimizes the risk to credit card issuers while allowing them to offer credit limits to applicants (having, for example, a poor or bad credit history) that adequately represent their status at the point of activation. There is also a need for an improved system and method for offering credit cards that provides an optimized credit limit for each applicant.

SUMMARY OF THE INVENTION

Systems and methods consistent with the principles of the present invention address the needs and drawbacks of past attempts by posing risk-splitting questions at the point of activation and determining the applicant's credit limit at that point in time. More specifically, systems and methods consistent with the invention provide a credit card product that allows optimal credit limit assignment for each applicant. The applicant applies for a credit card from the issuer. The issuer runs a credit report on the applicant and determines the applicant's credit limit based on credit information. The applicant's credit card is given a "temporary credit limit," based either on the applicant's credit limit set by a model which uses credit bureau or a set minimum credit limit, such as $200. In either case, the actual credit limit is determined at the time of activation, when the applicant answers certain risk-splitting questions. Ultimately, the actual credit limit will be determined based on credit information, answers to risk-splitting questions, and other information or "external data," such as purchase information from partner credit card issuer. As a result, the applicant is offered an increased value product and the issuer has confidence in the initial risk assessment.

According to an aspect of the invention, the issuer sends the applicant a credit card that has not been activate or has been activated to the temporary credit limit. The applicant is not informed of the value of the temporary credit limit and that value does not appear on subsequent monthly credit card statements. The applicant is invited to telephone or contact the issuer so as to activate the credit card. To contact the issuer, the applicant may be given the option to activate the credit card through the issuer's Web site on the Internet or through other communication means. Each applicant is also informed that upon contacting the issuer they will be informed of their credit limit. This credit limit is the actual credit limit that appears on the applicant's monthly credit card statements. If the applicant does not contact the issuer to activate the credit card, then the temporary credit limit defaults as the actual credit limit and, as a result, appears on the applicant's monthly credit card statements.

According to another aspect of the invention, the customer is prompted to answer a number (for example 3-6) of risk-splitting questions. The answers to the questions are relayed to the a computing platform or system, such as a Decision System. The Decision System evaluates whether to prompt different subsequent questions depending on the answers to the earlier questions. The questions may be posed by a live operator or voice recognition unit (VRU). The answers are either interpreted by the live operator and input into the Decision System or require standardized answers, which the VRU can recognize and transmit to the Decision System. The Decision System factors credit information, external data, and the answers to the risk-splitting questions to assign the actual credit limit.

In accordance with another aspect of the present invention, the applicant is informed of the actual credit limit during activation and the credit card is activated with the actual credit limit. Based on the risk-splitting questions posed by the Decision System and applicant's answers, the live operator or VRU may also offer to cross sell another of the issuer's products, such as refinancing for a home or home insurance.

BRIEF DESCRIPTION OF THE DRAWING

The accompanying drawings which are incorporated in and constitute a part of this specification, illustrate the various features and aspects of the present invention and, together with the description, explain the principles of the invention. In the drawings.

DETAILED DESCRIPTION

Systems and methods consistent with the present invention protect credit card issuers while addressing the needs of card holders by offering a credit card product with an optimized credit limit. The credit limit is determined by the issuer and is generally based on a number of non-exclusive factors, the most important of which are often the earning capacity and credit history of each potential customer. By tailoring the credit limit to potential customers based on their individual credit-worthiness, risk is minimized to the credit card issuer. The credit-worthiness incorporates the non-exclusive factors listed above, but can also incorporate other factors better determined by risk-splitting questions. As a result, with the features of the present invention, a credit card issuer is capable of maximizing the credit limit offered to each customer with information not otherwise captured by the non-exclusive factors listed above. In addition, a credit card issuer is able to establish and assign a credit limit for each customer based on more current information available at the time of activation of the credit card product.

The above-noted features and other aspects and principles of the present invention may be implemented in various system or network environments to provide automated computational tools to facilitate data collection, risk analysis, and credit limit assignment. Such environments and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by any suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include both machine code, such as produced by compiler, and files containing a high level code that can be executed by the computer using an interpreter.

Figure 1:
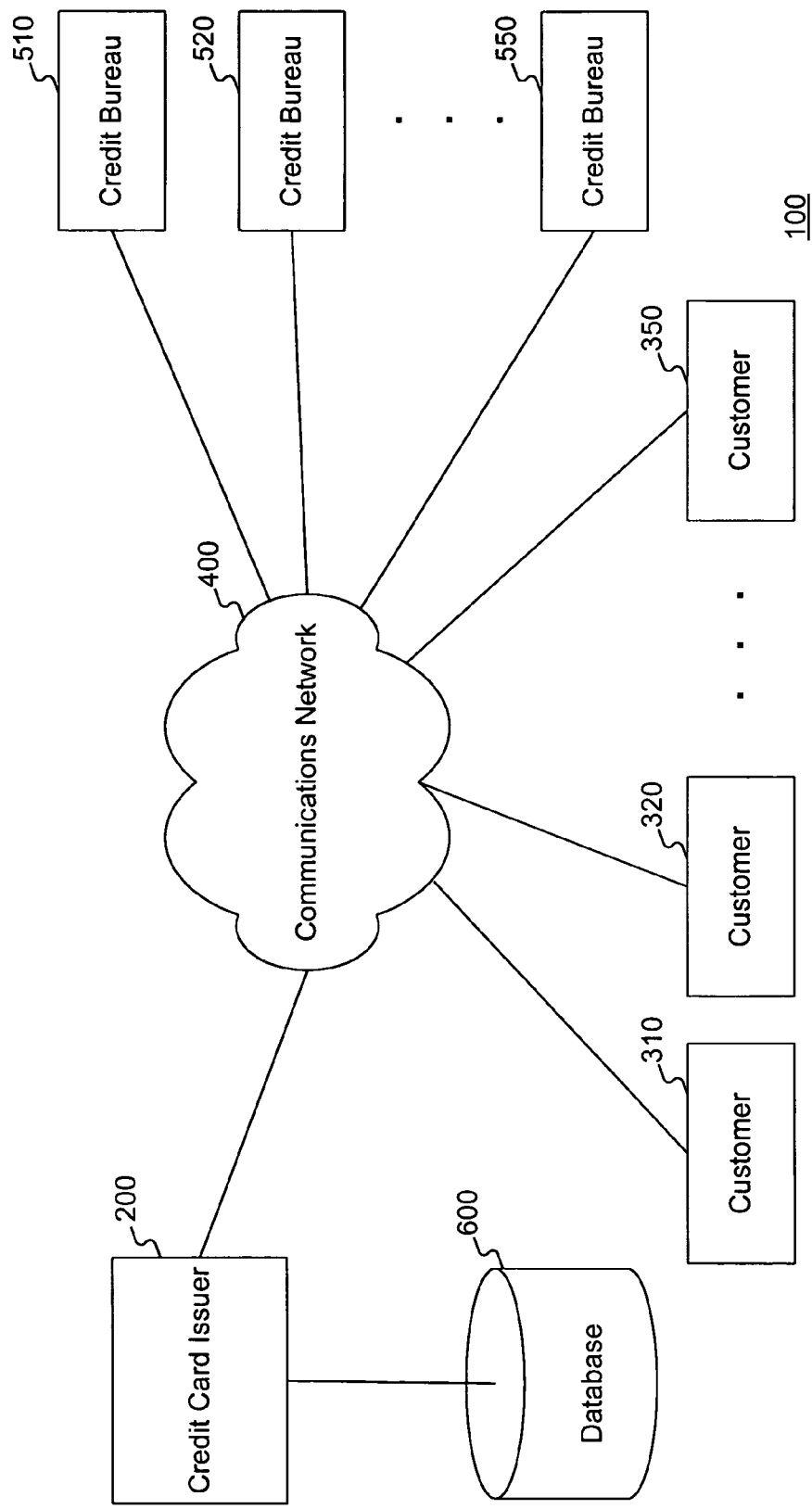
FIG. 1 illustrates an exemplary system environment in which the features of the present invention may be implemented.

By way of a non-limiting example, FIG. 1 illustrates a system environment 100 in which the features and principles of the present invention may be implemented. As illustrated in the block diagram of FIG. 1, a system environment 100 includes a credit card issuer 200, a database 600, one or more customers 310-350, and one or more credit bureaus 510-550 that may be connected through a communications network 400. A credit card issuer 200 is adapted to provide the necessary functionality and computing capabilities to analyze answers to risk-splitting questions from one or more customer 310-350, and credit bureau information provided from one or more of the credit bureaus 510-550 through communications network 400. Credit information (such as credit history) may be accessed and analyzed based on commercially available sources (such as the FICO model from Fair, Isaac and Company, Inc.) and/or through credit bureaus 510-550 which may include the one or more of the major credit bureaus such as TRW/Experian, Equifax and TransUnion. The risk-splitting questions are chosen by the credit card issuer 200 from the pool of questions available in the database 600. Output from the credit card issuer 200 includes the credit limit calculated by a computing platform and sent to the communication network 400 for relay to one or more customers 310-350. Output from credit card issuer 200 can also be provided to database 600, which may be utilized as a persistent storage device for storing new credit card account information including credit limits for accounts.

In the embodiment of FIG. 1, credit card issuer 200 communicates or transfers customer and credit data to and from one or more credit bureaus 510-550 through communications network 400. Communications network 400 may comprise, alone or in any suitable combination, a telephony-based network (such as a PBX or POTS), a local area network (LAN), a wide area network (WAN), a dedicated intranet, and/or the Internet. Further, any suitable combination of wired and/or wireless components and systems may be incorporated into communications network 400. Credit card issuer 200 also communicates to customers 310-350 through the communications network 400, as illustrated in FIG. 1. By using dedicated communication links or a shared network architecture, credit card issuer 200 may be located in the same location or at a geographically distant location from credit bureaus 510-550 and/or customers 310-350.

In accordance with the principles of the present invention, an exemplary credit card issuer will now be described with reference to FIG. 2.

Figure 2:
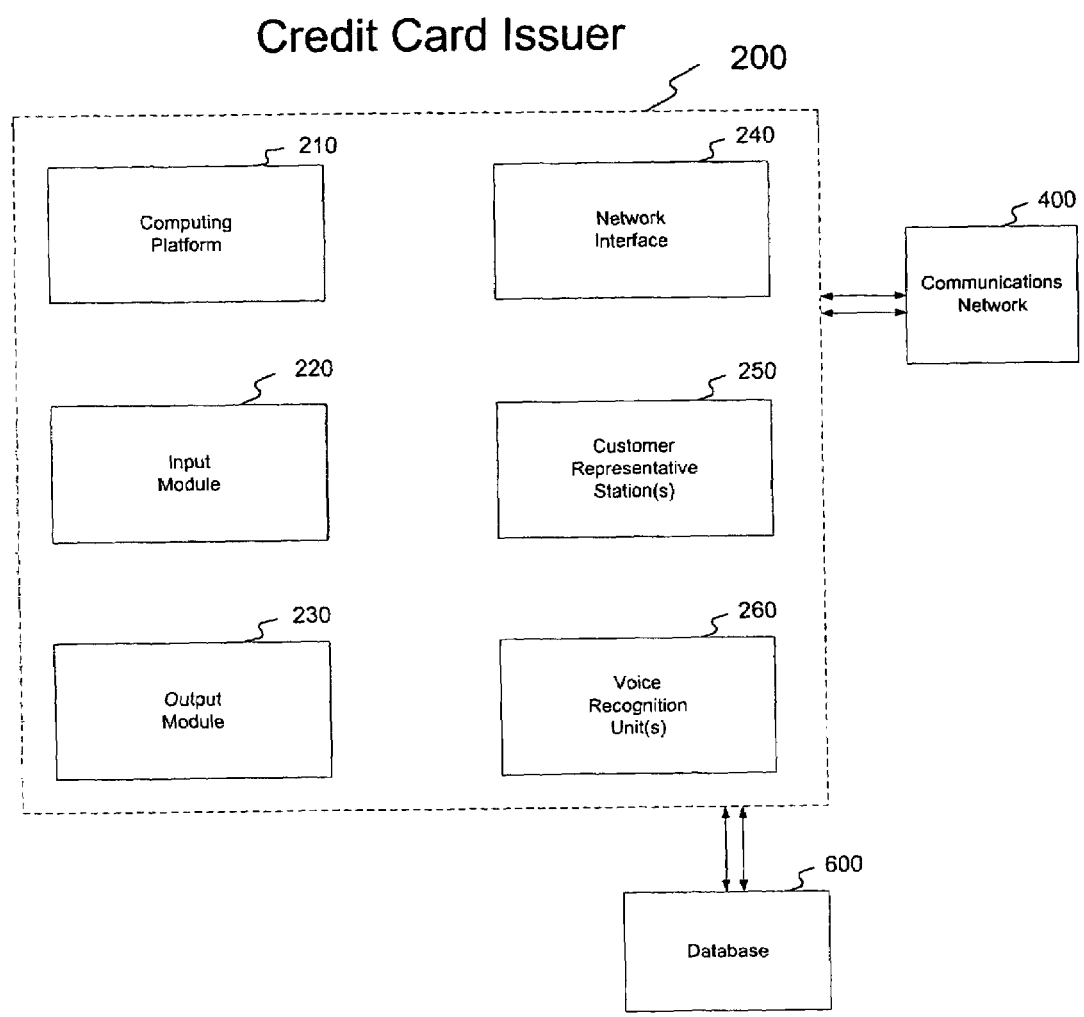
FIG. 2 illustrates an exemplary credit card issuer, consistent with the principles of the present invention.

By way of a non-limiting example, FIG. 2 illustrates a credit card issuer 200 in which the features and principles of the present invention may be implemented. As illustrated in the block diagram of FIG. 2, a credit card issuer 200 includes a computing platform 210, an input module 220, an output module 230, a network interface 240, customer representative station(s) 250, and voice recognition unit(s) 260. A computing platform 210 is adapted to provide the necessary functionality and computing capabilities to analyze each customer's answers to risk-splitting questions from the communications network 400 and channeled through the network interface 240, customer representative stations 250, or voice recognition units 260 to the input module 220. The risk-splitting questions, and activation and credit limit information are provided as output from computing platform 200 (interfacing with database 600) to output module 220 for communication to the network interface 240, customer representative stations 250, or voice recognition units 260.

A computing platform 210 preferably comprises a PC or mainframe computer for performing various functions and operations of the invention. Computing platform 210 may be implemented, for example, by a general purpose computer selectively activated or reconfigured by a computer program stored in the computer, or may be a specially constructed computing platform for carrying-out the features and operations of the present invention. Computing platform 210 may also be implemented or provided with a wide variety of components or subsystems including, for example, one or more of the following: one or more central processing units, a co-processor, memory, registers, and other data processing devices and subsystems.

Alternatively, communication between computing platform 210 and modules 220, 230 can be achieved through the use of a network architecture (not shown) similar to that described above for communications network 400.

Input module 220 of credit card issuer 200 may be implemented with a wide variety of devices to receive and/or provide the data as input to computing platform 210. As illustrated in FIG. 2, an input module 220 operates in conjunction with a customer representative stations 250, voice recognition units 260, or a network interface 240. Customer representative stations 250 may comprise a keyboard, a mouse, a disk drive or any other suitable input device for providing the answers to risk-splitting questions to computing platform 210. Voice recognition units 260 may comprise of a voice recognition unit to interpret the applicant's answers to risk-splitting questions. Network interface 240, as illustrated in FIG. 2, to receive data over a network (such as a LAN, WAN, intranet or the Internet) and to provide the same as input to computing platform 210. For example, network interface 240 may be connected to the issuer's Web site for the purpose of receiving and transferring answers to risk-splitting questions through the communications network 400.

As illustrated in FIG. 2, output module 230 operates in conjunction with a customer representative stations 250, voice recognition units 260, or a network interface 240 similar to the input module 220. The output from output module 220 can also be used for other purposes, such as internal reports or monitoring and interfacing with database 600.

In accordance with the principles of the present invention, an exemplary process for selecting customers will now be described with reference to FIG. 3.

Figure 3:
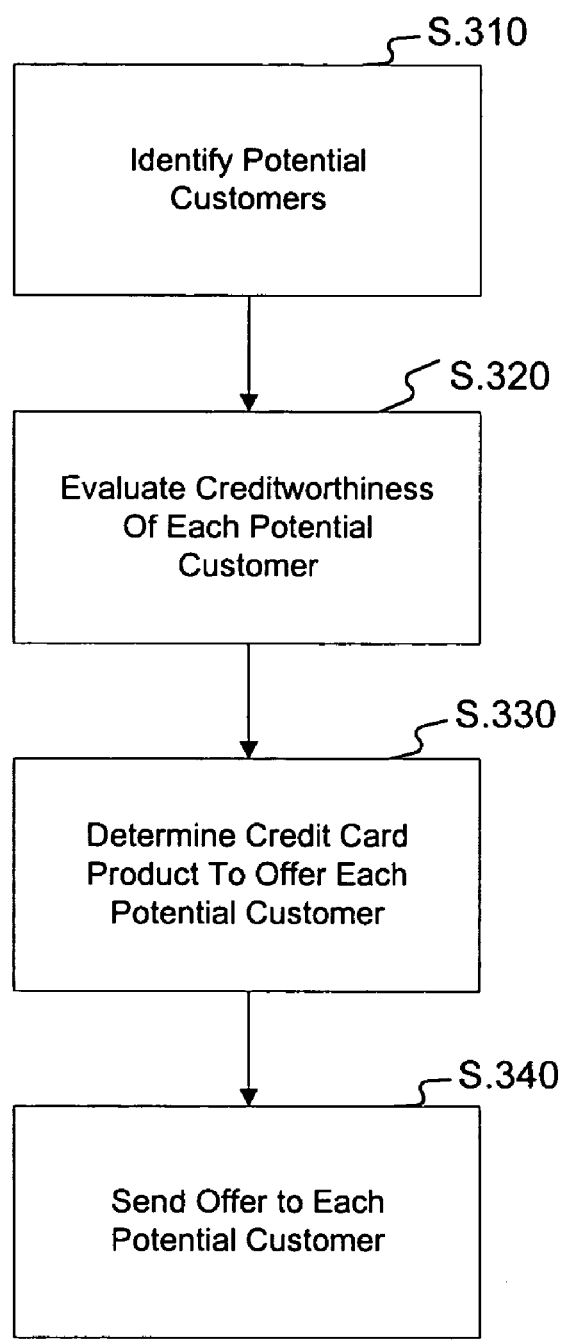
FIG. 3 illustrates an exemplary flowchart of a process for selecting applicants, consistent with the principles of the present invention.

FIG. 3 is an exemplary flowchart of a process for selecting customers for the issuer's credit card products. As illustrated in FIG. 3, the credit card issuer identifies potential customers (Step S.310). The credit card issuer then evaluates the creditworthiness of each potential customer (Step S.320). The credit card issuer then decides which product to offer each potential customer based on their creditworthiness (Step S.330). The credit card issuer then sends an offer of the credit card product to each potential customer (Step S.340).

In accordance with the principles of the present invention, an exemplary process for establishing customer accounts will now be described with reference to FIG. 4.

Figure 4:
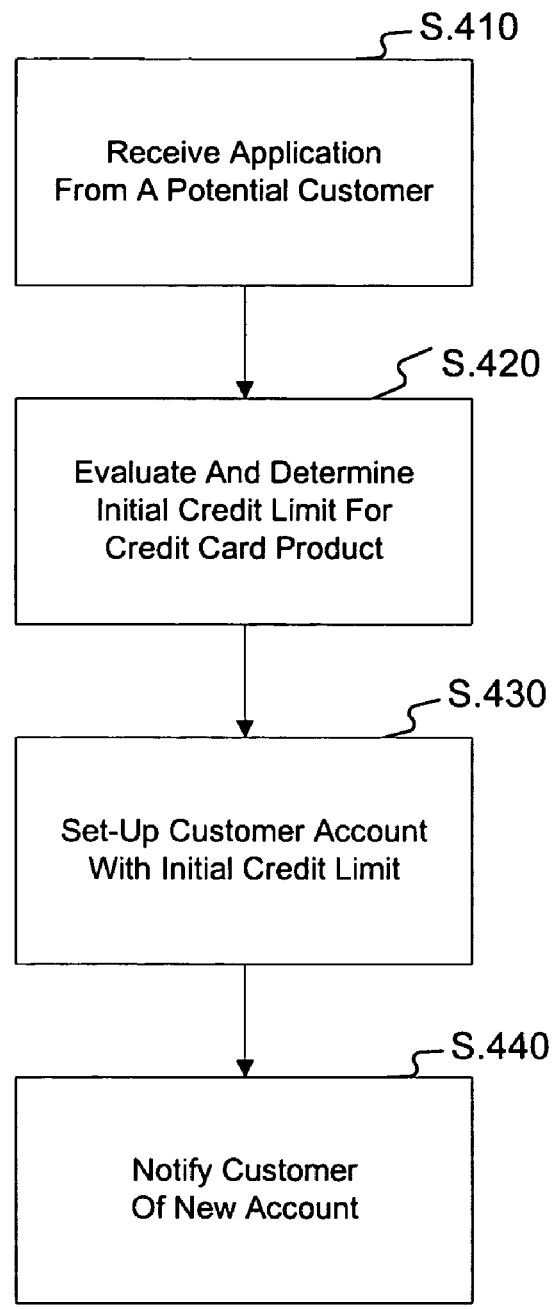
FIG. 4 illustrates an exemplary flowchart of a process for establishing customer accounts for applicants, consistent with the principles of the present invention.

FIG. 4 is an exemplary flowchart of a process for establishing customer accounts. As illustrated in FIG. 4, the credit card issuer receives an application for a potential customers (Step S.410). The credit card issuer then evaluates and determines a initial credit limit for the credit card product (step S.420). The credit card issuer then sets-up a customer account with an initial credit limit (Step S.430). The credit card issuer then notifies the customer of the new account which has not been activated. (Step S.440).

In accordance with the principles of the present invention, an exemplary process for optimizing credit limits assigned to customers will now be described with reference to FIG. 5.

Figure 5:
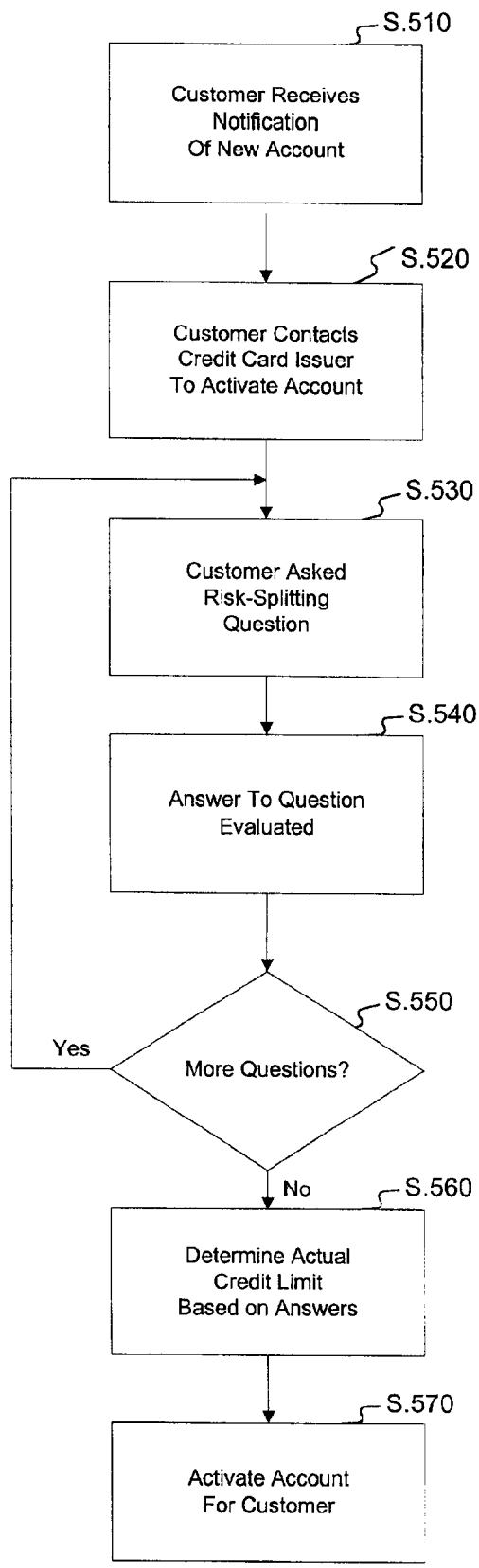
FIG. 5 illustrates an exemplary flowchart of a process for optimizing the credit limit assigned to customers, consistent with the principles of the present invention.

FIG. 5 is an exemplary flowchart of a process for optimizing credit limits assigned to customers. As illustrated in FIG. 5, a customer receives a notification of a new account that is not activated and is set-up with an initial credit limit (Step S.510). A customer then contacts a credit card issuer to activate the account (step S.520).

A credit card issuer then asks a customer a risk-splitting question (Step S.530). Risk-splitting questions may include: What is your gross annual income? Do you have a car? Do you have a checking account? Do you own your current residence? How many other credit cards do you have? What is your monthly housing/rent payment? Do you have a car loan? The customer then answers the question and the credit card issuer evaluates the answer (Step S.540).

The credit card issuer then makes a decision whether to ask more questions (Step S. 550). The answers and whether to ask additional questions may be determined by using a logical sequence of questions (i.e. Do you have a car? If yes, then Do you have a car loan?) and/or sequencing questions based on risk, quantified by a FICO score, and evaluated against a threshold value X (i.e. Do you have other credit cards? If FICO score>X and answer is yes, then ask How long have you been a member with those credit cards? or decide no more questions. If FICO score>X and answer is no, then ask another line of questions) and/or other behaviors like the length of time elapsed between the time when customer's account is set up by the credit card provider and the time of activation.

If the credit card issuer decides to ask more questions return to Step S. 530, if not then proceed to step S. 560. If a credit card issuer has completed asking risk-splitting questions then it determines an actual credit limit based on a customer's answers to the risk-splitting questions. (Step S. 560). A credit card issuer inputs a customer's risk (FICO) score communicated from the credit bureaus and a customer's answers to the risk-splitting questions and uses them as parameters in a model which weigh each parameter and determines a score. The score is correlated to a predetermined credit limit and then assigned to that credit card product. Another example of a parameter in this type of model may be the length of time that it takes the customer to activate the credit card product from the time the customer receives notification of the new account.

A credit card issuer then activates an account for the customer and informs them of their credit limit. (Step S. 570).

What is claimed is:

1. A method for providing a credit card product, comprising:
   associating a financial account with an un-activated credit card that is provided to an applicant, wherein the associating is performed by a computer system configured to communicate with the applicant over a communication network;
   analyzing, by the computer system, a first response to a first risk splitting question provided to the applicant;
   generating, by the computer system, a second risk splitting question based on the first response for provision to the applicant, the second risk splitting question being configured to elicit additional information regarding subject matter associated with the first response;
   determining, by the computer system, a credit limit for the financial account based on the first response and a second response by the applicant to the second risk splitting question; and
   activating, by the computer system, the credit card with the credit limit.

2. The method according to claim 1, wherein associating the financial account includes:
   generating, for the applicant, the financial account based on prior approval of the financial account based on credit bureau information.

3. The method according to claim 2, further including:
   assigning a temporary credit limit for the financial account based on the credit bureau information.

4. The method according to claim 3, wherein the un-activated credit card is provided to the applicant without informing the applicant of the temporary credit limit.

5. The method according to claim 1, wherein analyzing the first response to the first risk splitting question further includes:
   inviting the applicant to telephone an issuer to activate the credit card by telephone.

6. The method according to claim 5, wherein the method further comprises a live person posing the first and second risk-splitting questions to the applicant and translating the respective first and second responses into a standardized format.

7. The method according to claim 5, wherein the method further comprises a voice recognition unit posing the first and second risk-splitting questions to the applicant and requiring that the applicant respond in a standardized format.

8. The method according to claim 5, wherein the method further comprises a means for confirming the applicant's responses to the first and second risk-splitting questions.

9. The method according to claim 1, wherein the determining the credit limit is based on credit bureau information associated with the applicant and the applicant's first and second responses to the first and second risk-splitting questions.

10. The method according to claim 9, wherein determining the credit limit further includes:
    determining the credit limit based on external data obtained from an entity that is remote from the computer system.

11. The method according to claim 1, wherein activating the credit card comprises cross-selling at least one other product based upon the applicant's responses to at least one of the first and second risk-splitting questions.

12. The method according to claim 1, wherein generating the second risk splitting question based on the first response and a determination that a credit rating associated with the applicant meets a predetermined threshold value.

13. The method according to claim 1, wherein the first risk-splitting question comprises one of asking the applicant for the applicant's gross annual income, asking the applicant if the applicant has a car, asking the applicant if the applicant has a checking account, asking the applicant if the applicant owns a residence, asking the applicant for the applicant's monthly housing or rent payment, asking the applicant if the applicant has a car loan, or asking the applicant how many credit cards the applicant has.

14. A system for providing a credit card product, said system comprising:
    means for generating a financial account associated with an un-activated credit card that is provided to an applicant;
    means for analyzing a first response to a first risk splitting question provided to the applicant;
    means for generating a second risk splitting question based on the first response for provision to the applicant, the second risk splitting question being configured to elicit additional information regarding subject matter associated with the first response;
    means for determining a credit limit for the financial account based on the first response and a second response by the applicant to the second risk splitting question; and
    means for activating the credit card with the credit limit.

15. The system according to claim 14, further comprising:
    means for receiving the first and second response from the applicant via the Internet; and
    means for activating the credit card via the Internet.

16. The system according to claim 15, further comprising means for assigning a temporary credit limit for the financial account based on credit bureau information.

17. The system according to claim 16, further comprising means for confirming the applicant's answers to the risk-splitting questions.

18. The system according to claim 17, wherein the means for determining a credit limit includes means for analyzing credit bureau information and the first and second responses to determine the credit limit.

19. The system according to claim 14, wherein the means for generating the second risk splitting question generates the second risk splitting question based on the first response and a determination that a credit rating associated with the applicant meets a predetermined threshold value.

20. The system according to claim 14, wherein the first risk-splitting question comprises one of asking the applicant for the applicant's gross annual income, asking the applicant if the applicant has a car, asking the applicant if the applicant has a checking account, asking the applicant if the applicant owns a residence, asking the applicant for the applicant's monthly housing or rent payment, asking the applicant if the applicant has a car loan, or asking the applicant how many credit cards the applicant has.

21. A computer program product for providing a credit card product, the computer program product comprising computer-readable media having computer-readable code, the computer program product comprising the following computer-readable program code for effecting actions in a computing platform;
    program code for identifying an applicant based upon a response to at least a first risk-splitting question;
    program code for selecting a second risk-splitting question based on the response to the first risk-splitting question, wherein the second risk-splitting question is configured to elicit detailed information regarding subject matter associated with the first risk-splitting question;
    program code for incorporating credit bureau information into a calculation of a credit limit; and program code for calculating an increase to the credit limit based upon (a) at least one of the response to first risk-splitting question and a second response to the second risk-splitting question and (b) the credit bureau information.

22. The computer program product according to claim 21, wherein the program code for calculating an increase to the credit bureau credit limit comprises program code for incorporating external data.

23. The computer program product according to claim 21, wherein the program code for selecting the second risk-splitting question is further configured to determine that the applicant's credit rating exceeds a threshold value before selecting the second risk-splitting question.

24. The computer program product according to claim 21, wherein the first risk-splitting question comprises one of asking the applicant for the applicant's gross annual income, asking the applicant if the applicant has a car, asking the applicant if the applicant has a checking account, asking the applicant if the applicant owns a residence, asking the applicant for the applicant's monthly housing or rent payment, asking the applicant if the applicant has a car loan, or asking the applicant how many credit cards the applicant has.

25. A computer program product for providing a credit card product, the computer program product comprising computer-readable media having computer-readable code, the computer program product comprising the following computer-readable program code for effecting actions in a computing platform;
    program code for identifying an applicant for a credit card based upon a first response to at least a first risk-splitting question;
    program code for selecting a second risk-splitting question based on the answer to the first risk-splitting question, wherein the second risk-splitting question is configured to elicit detailed information regarding subject matter associated with the first risk-splitting question;
    program code for determining a credit limit associated with the credit card based on credit bureau information; and
    program code for calculating a decrease to the credit limit based upon (a) the first response to the first risk-splitting question and a second response to the second risk-splitting question and (b) the credit bureau information.

26. The computer program product according to claim 25, wherein the program code for calculating the decrease to the credit limit further includes program code for calculating the credit limit decrease based on external data obtained from an entity that is remote from the computer system.

27. The computer program product according to claim 25, wherein the program code for selecting the second risk-splitting question is further configured to determine that the applicant's credit rating exceeds a threshold value before selecting the second risk-splitting question.

28. The computer program product according to claim 25, wherein the first risk-splitting question comprises one of asking the applicant for the applicant's gross annual income, asking the applicant if the applicant has a car, asking the applicant if the applicant has a checking account, asking the applicant if the applicant owns a residence, asking the applicant for the applicant's monthly housing or rent payment, asking the applicant if the applicant has a car loan, or asking the applicant how many credit cards the applicant has.

29. A method for providing a credit card product, said method comprising:
    associating a financial account with an activated credit card that is provided to an applicant, wherein the associating is performed by a computer system configured to communicate with the applicant over a communication network;
    generating, by the computer system, a first risk splitting question for provision to the applicant;
    analyzing, by the computer system, a first response to the first risk splitting question;
    generating, by the computer system, a second risk splitting question based on the first response for provision to the applicant, the second risk splitting question being configured to elicit detailed information regarding subject matter associated with the first response;
    determining, by the computer system, a credit limit for the financial account based on the first response and a second response by the applicant to the second risk splitting question; and
    increasing the credit limit.

30. The method according to claim 29, wherein associating the financial account includes:
    generating, for the applicant, the financial account based on prior approval of the financial account based on credit bureau information.

31. The method according to claim 30, wherein the activated credit card is provided to the applicant without informing the applicant of a temporary credit limit.

32. The method according to claim 31, wherein generating the first risk splitting question includes generating information reflecting an invitation to the applicant to activate contact a credit card issuer by telephone.

33. The method according to claim 30, wherein generating the first and second risk splitting questions includes:
    translating voice data reflecting the risk splitting questions provided by a person into a standardized format.

34. The method according to claim 30, wherein the first and second risk splitting questions are provided to the applicant through a voice recognition unit and the method further includes:
    receiving the first and second responses in a standardized format.

35. The method according to claim 30, wherein said method further comprises:
    confirming the first and second responses to the first and second risk-splitting questions.

36. The method according to claim 29, wherein determining the credit limit includes:
    determining the credit limit based on credit bureau information and the first and second responses.

37. The method according to claim 29, wherein determining the credit limit further includes:
    determining the credit limit based on external data obtained from an entity that is remote from the computer system.

38. The method according to claim 29, wherein generating the second risk splitting question based on the first response and a determination that a credit rating associated with the applicant meets a predetermined threshold value.

39. The method according to claim 29, wherein the first risk-splitting question comprises one of asking the applicant for the applicant's gross annual income, asking the applicant if the applicant has a car, asking the applicant if the applicant has a checking account, asking the applicant if the applicant owns a residence, asking the applicant for the applicant's monthly housing or rent payment, asking the applicant if the applicant has a car loan, or asking the applicant how many credit cards the applicant has.

* * * * *